(12) United States Patent
Yoo et al.

(10) Patent No.: US 10,256,455 B2
(45) Date of Patent: Apr. 9, 2019

(54) SECONDARY BATTERY

(71) Applicant: Samsung SDI Co., Ltd., Yongin-si, Gyeonggi-do (KR)

(72) Inventors: Seungyeol Yoo, Yongin-si (KR); Seokyoon Yoo, Yongin-si (KR); Yongwoo Jung, Yongin-si (KR); Seungwon Shin, Yongin-si (KR); Eunha Kim, Yongin-si (KR); Youngjin Yoon, Yongin-si (KR); Backgun Kim, Yongin-si (KR); Wooksu Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 190 days.

(21) Appl. No.: 15/130,687

(22) Filed: Apr. 15, 2016

(65) Prior Publication Data

US 2017/0098813 A1    Apr. 6, 2017

(30) Foreign Application Priority Data

Oct. 2, 2015  (KR) .......................... 10-2015-0139031

(51) Int. Cl.
*H01M 2/26* (2006.01)
*H01M 2/06* (2006.01)
(Continued)

(52) U.S. Cl.
CPC ........... *H01M 2/26* (2013.01); *H01M 2/0217* (2013.01); *H01M 2/0285* (2013.01); *H01M 2/06* (2013.01);
(Continued)

(58) Field of Classification Search
None
See application file for complete search history.

(56) References Cited

U.S. PATENT DOCUMENTS

| 2010/0040945 A1 | 2/2010 | Wang et al. | |
| 2010/0233519 A1* | 9/2010 | Cheon | H01M 2/34 429/56 |

(Continued)

FOREIGN PATENT DOCUMENTS

| DE | 10-2005-060762 A1 | 6/2007 |
| KR | 10-2009-0089292 A | 8/2009 |

(Continued)

OTHER PUBLICATIONS

EPO Extended Search Report dated Dec. 23, 2016, for corresponding European Patent Application No. 16173725.9 (8 pages).

*Primary Examiner* — Daniel S Gatewood
(74) *Attorney, Agent, or Firm* — Lewis Roca Rothgerber Christie LLP (57) ABSTRACT

There is provided a secondary battery comprising an electrode assembly including a first electrode plate having a first electrode tab, a second electrode plate having a second electrode tab and a separator between the first electrode plate and the second electrode plate, a case including a body accommodating the electrode assembly, a cap plate covering a top portion of the body, and a bottom plate covering a bottom portion of the body, a first electrode terminal electrically connected to the first electrode tab, a second electrode terminal electrically connected to the second electrode tab through the case, and a connection plate electrically connected to the second electrode tab and configured to bend away from the bottom plate, the connection plate being on the bottom plate.

8 Claims, 6 Drawing Sheets

(51) Int. Cl.
*H01M 2/30* (2006.01)
*H01M 2/02* (2006.01)
*H01M 10/04* (2006.01)

(52) U.S. Cl.
CPC .............. *H01M 2/30* (2013.01); *H01M 2/263* (2013.01); *H01M 10/0431* (2013.01)

(56) References Cited

U.S. PATENT DOCUMENTS

| | | | |
|---|---|---|---|
| 2011/0300423 A1* | 12/2011 | Lee .................... | H01M 2/0202 429/94 |
| 2012/0251854 A1 | 10/2012 | Kusama et al. | |
| 2014/0220409 A1* | 8/2014 | Hohenthanner ...... | H01M 2/027 429/130 |
| 2015/0004446 A1 | 1/2015 | Kim et al. | |

FOREIGN PATENT DOCUMENTS

| KR | 10-2012-0052902 A | 5/2012 |
|---|---|---|
| KR | 10-2014-0106327 A | 9/2014 |

* cited by examiner

SECONDARY BATTERY

CROSS-REFERENCE TO RELATED APPLICATION

This application claims priority to and the benefit of Korean Patent Application No. 10-2015-0139031, filed on Oct. 2, 2015 in the Korean Intellectual Property Office, the content of which is incorporated by reference herein in its entirety.

BACKGROUND

1. Field

Aspects of embodiments of the present invention relate to a secondary battery.

2. Description of the Related Art

In general, in order to fabricate a high-capacity battery, as many electrode plates as possible should be wound and placed in a can having a given volume. In addition, in order to increase an amount of active material coated on the electrode plates, the volume of the can occupied by a current collector should be reduced. However, because current collecting efficiency should be maintained to fabricate a high-power battery, an electrode tab is welded to an electrode assembly whenever each of the turns of the winding is accomplished to fabricate the high-power battery. The fully-fabricated electrode assembly is referred to as a multi-tab electrode assembly.

In the conventional process for attaching an electrode tab of an electrode assembly to a case, an auxiliary tab is welded to the electrode tab and the auxiliary tab is then welded to a cap plate or a bottom plate of the case. Here, the auxiliary tab has a primary bending structure formed at a portion welded to the electrode tab and has a secondary bending structure formed by assembling the cap plate or the bottom plate into the case.

The aforementioned process, however, may undesirably increase processing costs due to additional equipment for attaching and bending processes. In addition, when stress, such as vibrations or electrical or mechanical shocks, is applied to the bent portion of the auxiliary tab for an extended period of time, the bent portion of the auxiliary tab may be cut due to the stress.

SUMMARY

Aspects of embodiments of the present invention are directed to a secondary battery having improved durability against stress, such as vibrations or electrical or mechanical shocks, by reducing (e.g., minimizing) a welded and bent portion of an electrode tab by directly connecting an electrode assembly to a case.

The above and other aspects of the present invention will be described in or be apparent from the following description of exemplary embodiments.

According to some embodiments of the present invention, there is provided a secondary battery comprising: an electrode assembly including a first electrode plate having a first electrode tab, a second electrode plate having a second electrode tab and a separator between the first electrode plate and the second electrode plate; a case including a body accommodating the electrode assembly, a cap plate covering a top portion of the body, and a bottom plate covering a bottom portion of the body; a first electrode terminal electrically connected to the first electrode tab; a second electrode terminal electrically connected to the second electrode tab through the case; and a connection plate electrically connected to the second electrode tab and configured to bend away from the bottom plate, the connection plate being on the bottom plate.

In an embodiment, the connection plate is formed by stamping a peripheral portion of a region of the bottom plate.

In an embodiment, a connecting part connected to the bottom plate and a stamping part formed in a single line processed by stamping form a periphery of the connection plate, and the stamping part is configured to separate the peripheral portion of the connection plate from the bottom plate.

In an embodiment, the connection plate is on a same line as the bottom plate.

In an embodiment, a coupling groove is on an outer surface of the bottom plate and a portion of a bottom surface of the coupling groove constitutes the connection plate.

In an embodiment, the bottom plate further includes a cover plate placed in the coupling groove and fastened with the coupling groove to seal the connection plate.

In an embodiment, the secondary battery further includes a bottom insulation member between the electrode assembly and the bottom plate, wherein an opening through which the second electrode tab penetrates is in a region of the bottom insulation member, the region corresponding to the connection plate.

In an embodiment, a spacer protruding from a top surface of the bottom plate forms a space between the bottom plate and the bottom insulation member, and wherein a portion of the second electrode tab connected to the connection plate is bent and positioned in the space.

In an embodiment, the second electrode plate is connected to the bottom plate through the second electrode tab and the connection plate.

In an embodiment, the first electrode tab extends in a direction extending from the first electrode plate to the cap plate and the second electrode tab extends in a direction extending from the second electrode plate to the bottom plate.

As described above, according to some embodiments of the present invention, the secondary battery having improved durability against stress can be provided by reducing (e.g., minimizing) a welded and bent portion of an electrode tab by directly connecting an electrode assembly to a case.

BRIEF DESCRIPTION OF THE DRAWINGS

The above and other features of the present invention will become more apparent by describing in detail exemplary embodiments thereof with reference to the attached drawings in which:

FIGS. 6-9 are diagrams illustrating an assembling sequence of a second electrode tab and a bottom plate according to an embodiment of the present invention.

DETAILED DESCRIPTION

Hereinafter, examples of embodiments of the invention will be described in detail with reference to the accompanying drawings such that they can readily be made and used by those skilled in the art.

Figure 1:
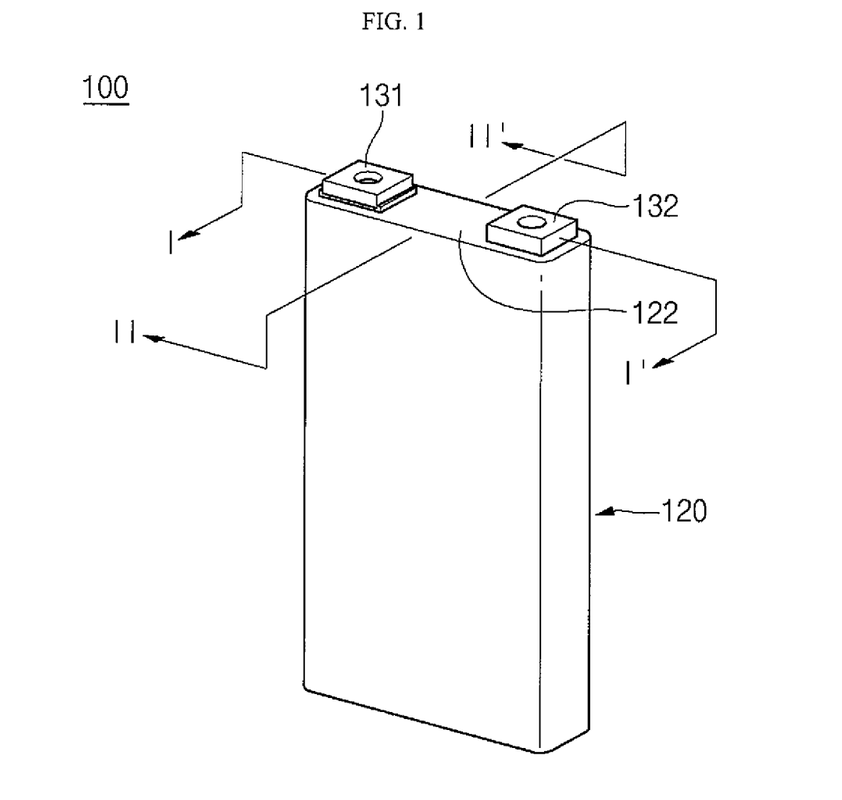
FIG. 1 is a perspective view of a secondary battery according to an embodiment of the present invention.
Figure 2:
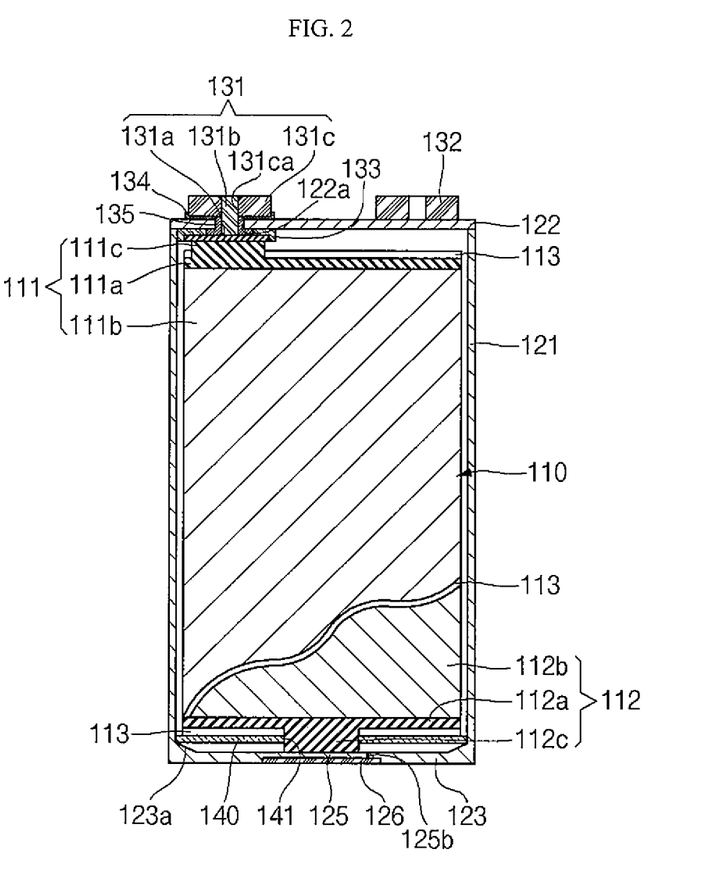
FIG. 2 is a cross-sectional view taken along the line I-I' of FIG. 1.
Figure 3:
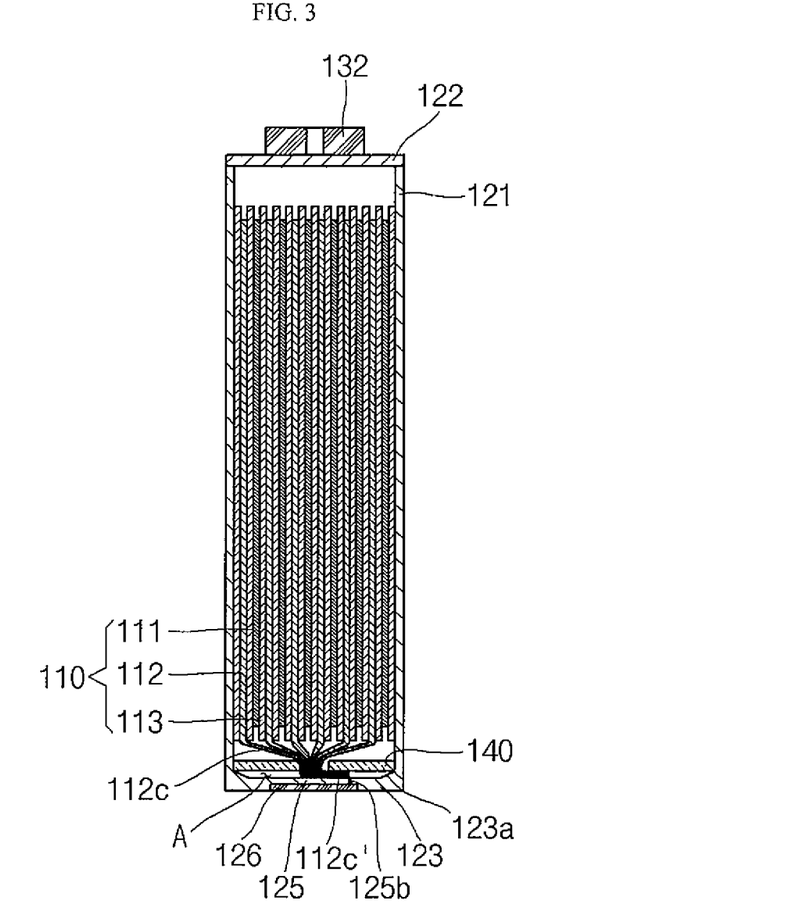
FIG. 3 is a cross-sectional view taken along the line II-II' of FIG. 1.
Figure 4:
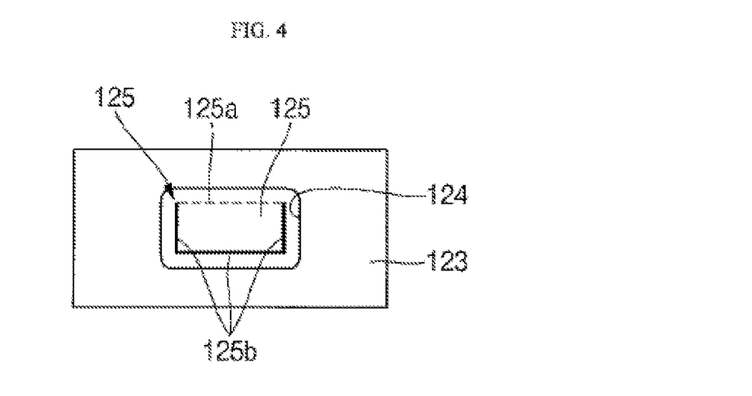
FIG. 4 is a plan view of a bottom plate illustrating a connection plate according to an embodiment of the present invention.
Figure 5:
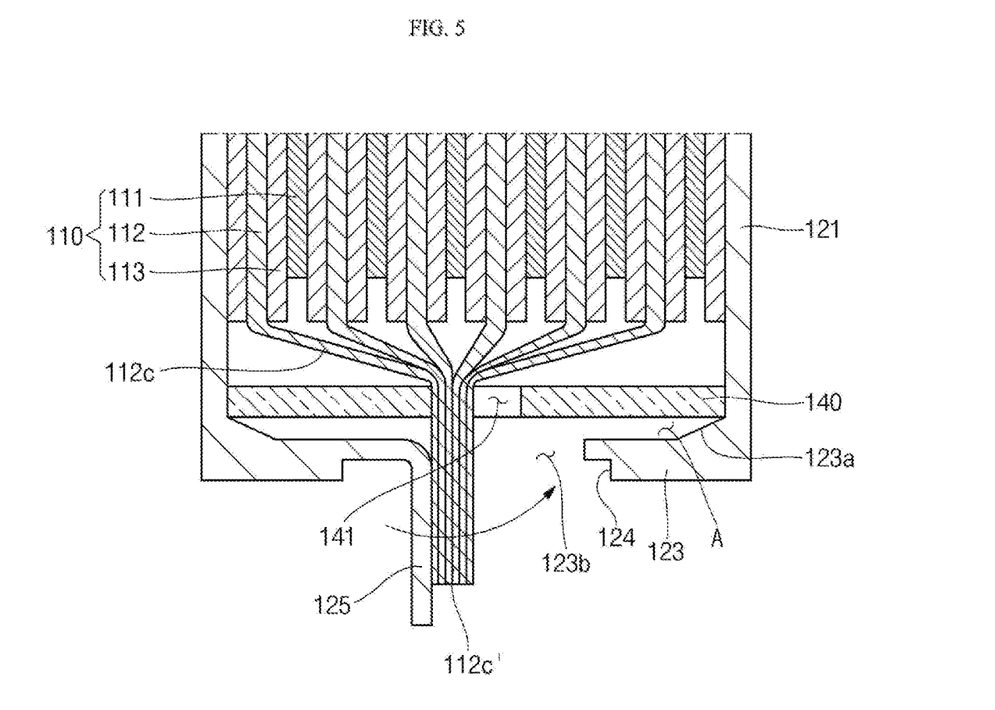
FIG. 5 is a diagram illustrating a connection method of a second electrode tab and a connection plate according to an embodiment of the present invention.

FIG. 1 is a perspective view of a secondary battery according to an embodiment of the present invention, FIG. 2 is a cross-sectional view taken along the line I-I' of FIG. 1, FIG. 3 is a cross-sectional view taken along the line II-II' of FIG. 1, FIG. 4 is a plan view of a bottom plate illustrating a connection plate according to an embodiment of the present invention, and FIG. 5 is a diagram illustrating a connection method of a second electrode tab and a connection plate according to an embodiment of the present invention.

Referring to FIGS. 1 to 5, the secondary battery 100 according to an embodiment of the present invention includes an electrode assembly 110, a case 120 and an electrode terminal portion 130. In addition, the secondary battery 100 may further include a bottom insulation member 140.

The electrode assembly 110 may include a first electrode plate 111, a second electrode plate 112 and a separator 113.

The first electrode plate 111 may be formed by coating a first electrode active material 111b (e.g., graphite or carbon) on a first electrode current collector 111a made of a metal foil (e.g., a copper or nickel foil). The first electrode plate 111 may include a plurality of first electrode tabs 111c extending and protruding from a region of the first electrode current collector 111a, which is not coated with the first electrode active material 111b, toward the cap plate 122. The first electrode tabs 111c may be formed (e.g., aligned) at a preset or predetermined position through a winding process in the course of fabricating the electrode assembly 110, thereby forming a multi-tab structure. Each of the first electrode tabs 111c is electrically connected to a first electrode terminal 131, thereby establishing a path for the flow of current between the first electrode plate 111 and the first electrode terminal 131.

The second electrode plate 112 may be formed by coating a second electrode active material 112b, e.g., a transition metal oxide, on a second electrode current collector 112a made of a metal foil, e.g., an aluminum foil. The second electrode plate 112 may include a plurality of second electrode tabs 112c extending and protruding from a region of the second electrode current collector 112a, which is not coated with the second electrode active material 112b, toward the bottom plate 123. Thus, the second electrode tabs 112c may extend in the opposite direction to the first electrode tabs 111c. The second electrode tabs 112c may be formed (e.g., aligned) at a preset or predetermined position through the winding process in the course of fabricating the electrode assembly 110, thereby forming a multi-tab structure. Each of the second electrode tabs 112c is electrically connected to the bottom plate 123 of the case 120, thereby establishing a path for the flow of current between the second electrode plate 112 and the case 120.

The separator 113, which is interposed between the first and second electrode plates 111 and 112, may prevent short circuits between the first and second electrode plates 111 and 112, and may allow fluid ions, such as lithium ions, to freely move. The separator 113 may be formed to have a greater width than the first electrode plate 111 and the second electrode plate 112, so that it protrudes more than the first electrode plate 111 and the second electrode plate 112 in upward and downward directions. Therefore, the separator 113 may prevent the first electrode plate 111 and the second electrode plate 112 from directly contacting the internal surface of the case 120 (in both the upward and downward directions with respect to the first electrode plate 111 and the second electrode plate 112).

As described above, the first electrode plate 111 may function as a negative electrode and the second electrode plate 112 may function as a positive electrode, or vice versa.

The case 120 may be made of a conductive metal, such as aluminum, an aluminum alloy, or nickel plated steel, and may have a substantially hexahedral shape.

The case 120 may include a body 121, a cap plate 122, and a bottom plate 123.

The body 121 may be shaped as a rectangular bar (container) having open top and bottom ends and may form a receiving space of the electrode assembly 110.

The cap plate 122 may be coupled to the top end of the body 121 to seal the top-end opening. A first terminal hole 122a may be formed at one side of the cap plate 122. A terminal pin 131b of the first electrode terminal 131 may be inserted into and penetrate the first terminal hole 122a.

The bottom plate 123 may be coupled to the bottom end of the body 121 to seal the bottom-end opening. A coupling groove 124 may be formed on an outer surface of the bottom plate 123. A connection plate 125 electrically connected to the second electrode tab 112c may be formed on a bottom surface of the coupling groove 124.

The connection plate 125 forms a preset or predetermined region of the coupling groove 124, and a peripheral portion (e.g., circumferential portion) of the preset or predetermined region may be stamped, so that the connection plate 125 may be bent from the bottom plate 123.

For example, as illustrated in FIG. 4, the connection plate 125 may form the preset or predetermined region having a rectangular shape in the coupling groove 124. In addition, the periphery (e.g., the circumference) of the connection plate 125 may be formed of a connecting part 125a and a stamping part 125b.

The connecting part 125a is connected to the bottom plate 123 and may be a portion bent from the bottom plate 123 when the second electrode tab 112c and the connection plate 125 are welded to each other.

The stamping part 125b, which is a portion processed by stamping, may form a single line along the periphery (e.g., circumference) of the connection plate 125, excluding the connecting part 125a, and may separate the peripheral portion (e.g., circumferential portion) of the connection plate 125 from the bottom plate 123.

In a state in which the connection plate 125 is outwardly bent from the bottom plate 123, as illustrated in FIG. 5, it is welded to the second electrode tab 112c and then bent again to be parallel with the bottom plate 123, so that it may restore its original position. The original position may refer to the original position of the connection plate 125, suggesting that the connection plate 125 is positioned on the same line with the bottom plate 123. Here, as the connection plate 125 restores to its original position, the second electrode tab 112c may be bent. For example, the second electrode tab 112c may downwardly extend from the electrode assembly 110 to the bottom plate 123 and may then be bent to be parallel with the connection plate 125 in a space A between the bottom plate 123 and the bottom insulation member 140.

The cover plate 126 may be placed in the coupling groove 124 to then be fastened therewith to seal the connection plate 125. For example, the cover plate 126 is inserted into the coupling groove 124 and an outer peripheral portion (e.g., an outer circumferential portion) of the cover plate 126 and an inner peripheral portion (e.g., an inner circumferential portion) of the coupling groove 124 are then welded to each other, thereby achieving coupling of the cover plate 126 and the coupling groove 124.

Because an electrolyte may leak through the stamping part 125b, the case 120 may be coupled to the bottom plate 123 to allow the cover plate 126 to hermetically seal gaps created by the stamping part 125b. In addition, the cover plate 126 is coupled to the coupling groove 124 such that it is mounted in the coupling groove 124, thereby increasing a coupling force between the bottom plate 123 and the cover plate 126 and reducing (e.g., minimizing) the increase in thickness of the bottom plate 123 due to the cover plate 126.

FIGS. 6 to 9 are diagrams illustrating an assembling sequence of a second electrode tab and a bottom plate according to an embodiment of the present invention.

First, as illustrated in FIG. 6, in a state in which the bottom plate 123 is coupled to the body 121, the connection plate 125 is outwardly bent from the bottom plate 123, so that the bottom plate 123 may have an opening 123b.

Figure 7:
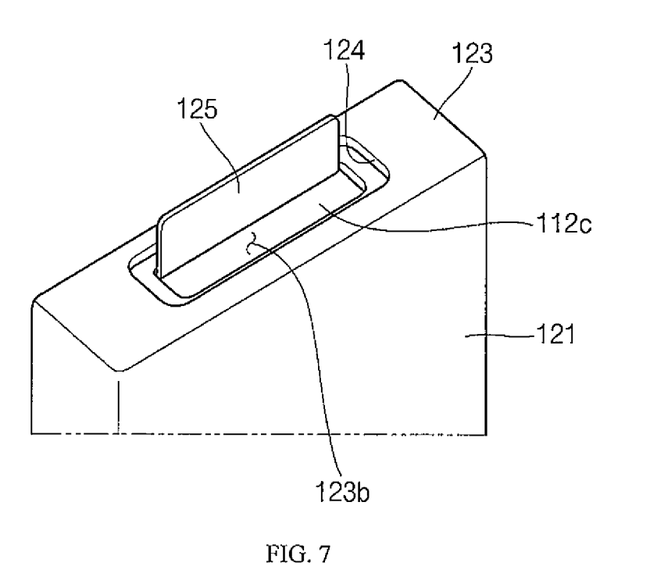

Next, as illustrated in FIG. 7, the second electrode tab 112c may be drawn out from the case 120 through the opening 123b of the bottom plate 123. The second electrode tab 112c drawn out from the case 120 may be disposed to be substantially parallel with the connection plate 125. In such a state, the second electrode tab 112c and the connection plate 125 may be connected to each other by ultrasonic welding or laser welding.

Figure 8:
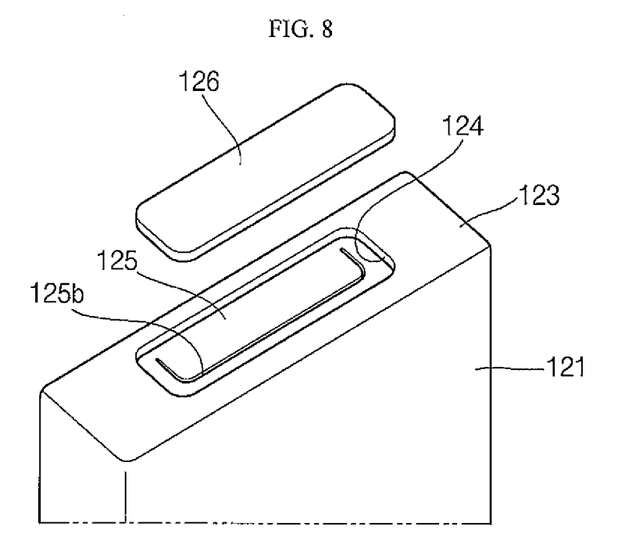

Next, as illustrated in FIG. 8, the connection plate 125 is bent again so as to be parallel with the bottom plate 123, thereby closing the opening 123b of the bottom plate 123.

Figure 9:
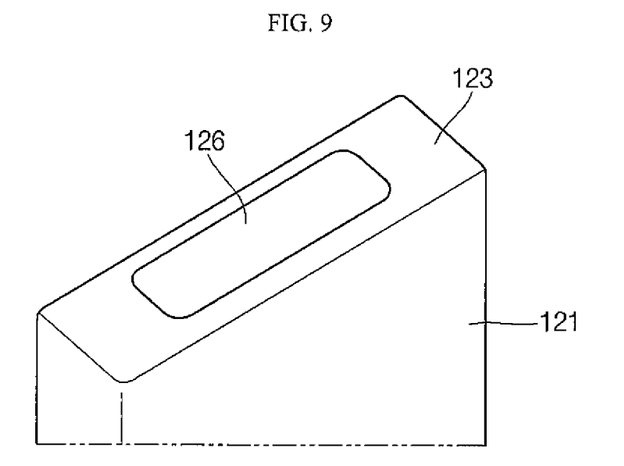

Finally, as illustrated in FIG. 9, the cover plate 126 is placed in the coupling groove 124 to then be coupled to the bottom plate 123 by welding.

The electrode terminal portion 130 may include a first electrode terminal 131 and a second electrode terminal 132.

As illustrated in FIG. 2, the first electrode terminal 131 may be coupled to the cap plate 122 to then be electrically connected to the first electrode tabs 111c. The first electrode terminal 131 may include a bottom terminal plate 131a, a terminal pin 131b and a top terminal plate 131c.

A bottom surface of the bottom terminal plate 131a may be electrically connected to the first electrode tab 111c and a top surface thereof may be coupled to the terminal pin 131b. In addition, the bottom terminal plate 131a may be electrically insulated from the internal surface of the case 120 by a lower insulation member 133.

A bottom portion of the terminal pin 131b may be coupled to the bottom terminal plate 131a. A top portion of the terminal pin 131b may protrude to the outside of the case 120 while passing through the first terminal hole 122a formed in the cap plate 122, may be inserted into a second terminal hole 131ca of the top terminal plate 131c to then be riveted, thereby achieving coupling of the terminal pin 131b and the top terminal plate 131c.

A seal gasket 135 may be assembled with the first terminal hole 122a together with the terminal pin 131b. The seal gasket 135 may insulate the terminal pin 131b from the cap plate 122 while sealing the first terminal hole 122a.

The top terminal plate 131c may be disposed on the cap plate 122 and may be electrically insulate from the cap plate 122 by an upper insulation member 134. Stepped portions may be formed at top edges of the upper insulation member 134. The stepped portions may protrude to an upper portion of the cap plate 122 so as to surround portions of lower side surfaces of the top terminal plate 131c, and may fix the top terminal plate 131c so as not to be rotated.

The second electrode terminal 132 may be coupled to the cap plate 122 and may be electrically connected to the second electrode tab 112c through the case 120. The second electrode terminal 132 may have the same configuration with the top terminal plate 131c.

The bottom insulation member 140 may be disposed between the electrode assembly 110 and the bottom plate 123 and may prevent the electrode assembly 110 and the bottom plate 123 from electrically contacting each other.

A throughhole (or an opening) 141 through which the second electrode tab 112c passes may be formed in a portion of the bottom insulation member 140 corresponding to the connection plate 125. The throughhole 141 may be sized to allow the second electrode tab 112c to pass therethrough.

A spacer 123a for separating the bottom insulation member 140 from the bottom plate 123 may be formed on a top surface of the bottom plate 123. The spacer 123a may be formed to protrude to a top portion of the bottom plate 123.

In the illustrated embodiment, the spacer 123a is formed at an edge portion of the top surface of the bottom plate 123 that is brought into contact with the body 121, which is illustrated only by way of example. Rather, the spacer 123a may be formed at any portion of the top surface of the bottom plate 123, so long as it does not interfere with the connection plate 125. In addition, the spacer 123a may be formed to have various suitable shapes.

An end 112c' bent from the second electrode tab 112c to be parallel with the connection plate 125 may be positioned in the space A between the bottom plate 123 and the bottom insulation member 140, which is formed by the spacer 123a.

According to an embodiment of the present invention, a bent surface is formed by stamping a bottom surface of a case, and an electrode tab extending from an electrode assembly is directly connected to the bent surface without an auxiliary tab in a state in which a bottom plate of the case is coupled to a body, thereby reducing (e.g., minimizing) a welded and bent portion of the electrode tab. Accordingly, the welded and bent portion of the electrode tab may be reduced (e.g., minimized), thereby improving the durability against stress, such as vibrations or electrical or mechanical shocks.

While the secondary battery of the present invention has been particularly shown and described with reference to exemplary embodiments thereof, it will be understood by those of ordinary skill in the art that various suitable changes in form and details may be made therein without departing from the spirit and scope of the present invention as defined by the following claims, and equivalents thereof.

What is claimed is:

1. A secondary battery comprising:
an electrode assembly comprising a first electrode plate having a first electrode tab, a second electrode plate having a second electrode tab and a separator between the first electrode plate and the second electrode plate;
a case comprising a body accommodating the electrode assembly, a cap plate covering a top portion of the body, and a bottom plate covering a bottom portion of the body;
a first electrode terminal electrically connected to the first electrode tab at the top portion of the body;

a second electrode terminal adjacent the first electrode terminal at the top portion of the body and electrically connected to the second electrode tab through the case; and a connection plate electrically connected to an end of the second electrode tab at the bottom portion of the body, the connection plate being configured to bend away from the bottom plate and to bend toward the bottom plate with the end of the second electrode tab, the connection plate being on the bottom plate, wherein a coupling groove is on an outer surface of the bottom plate and a portion of a bottom surface of the coupling groove constitutes the connection plate, and wherein the bottom plate further comprises a cover plate placed in the coupling groove and fastened with the coupling groove to seal the connection plate.

2. The secondary battery of claim 1, wherein the connection plate is formed by stamping a peripheral portion of a region of the bottom plate.

3. The secondary battery of claim 2, wherein a connecting part connected to the bottom plate and a stamping part formed in a single line processed by stamping form a periphery of the connection plate, and the stamping part is configured to separate the peripheral portion of the connection plate from the bottom plate.

4. The secondary battery of claim 1, wherein the connection plate is on a same line as the bottom plate.

5. The secondary battery of claim 1, further comprising a bottom insulation member between the electrode assembly and the bottom plate, wherein an opening through which the second electrode tab penetrates is in a region of the bottom insulation member, the region corresponding to the connection plate.

6. The secondary battery of claim 5, wherein a spacer protruding from a top surface of the bottom plate forms a space between the bottom plate and the bottom insulation member, and wherein a portion of the second electrode tab connected to the connection plate is bent and positioned in the space.

7. The secondary battery of claim 1, wherein the second electrode plate is connected to the bottom plate through the second electrode tab and the connection plate.

8. The secondary battery of claim 1, wherein the first electrode tab extends in a direction extending from the first electrode plate to the cap plate and the second electrode tab extends in a direction extending from the second electrode plate to the bottom plate.

* * * * *